No. 814,966. PATENTED MAR. 13, 1906.
C. R. KNIGHT & J. TENNESEN.
PORTABLE BRICK DRYING RACK.
APPLICATION FILED JULY 25, 1904.

2 SHEETS—SHEET 1.

Witnesses
Otto E. Hoddick.
Dena Nelson.

C. R. Knight.
J. Tennesen.
Inventors

Attorney

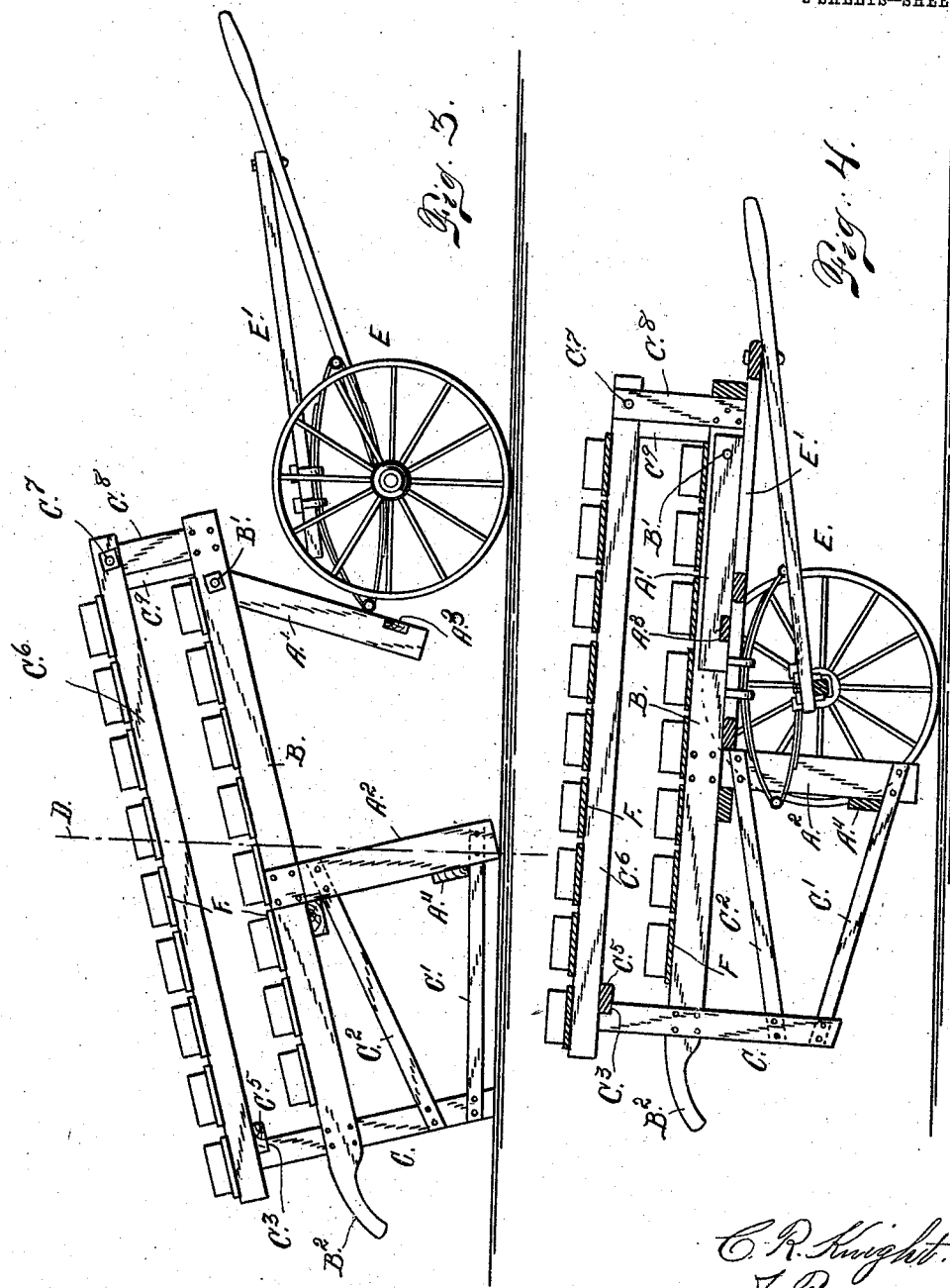

UNITED STATES PATENT OFFICE.

CHARLES R. KNIGHT AND JACOB TENNESEN, OF DENVER, COLORADO.

PORTABLE BRICK-DRYING RACK.

No. 814,966. Specification of Letters Patent. Patented March 13, 1906.

Application filed July 25, 1904. Serial No. 217,966.

*To all whom it may concern:*

Be it known that we, CHARLES R. KNIGHT and JACOB TENNESEN, citizens of the United States, residing in the city and county of Denver and State of Colorado, have invented certain new and useful Improvements in Portable Brick-Drying Racks; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to improvements in what we choose to term a "portable brick-drying rack," its object being to facilitate the handling of the brick from the time they are placed upon the rack until they are placed in the kiln.

Heretofore, so far as we are aware, the green brick or the brick when first molded are placed upon pallets, after which the pallets are loaded upon a wagon and transferred to stationary drying-racks, and after they are suitably dried they are again loaded upon a wagon and carried to the kiln.

In our improved construction the bricks when molded are placed directly upon the drying-rack, which is so constructed that a cart may be run under it, after which it is drawn to a suitable distance, after which the cart is removed until the bricks are dry. The cart is then again run under the rack, and the latter is drawn to the kiln in which the bricks are placed. In this way the bricks are only handled once from the time they are molded until they are placed in the kiln.

Our improved drying-rack is so constructed that it may be tilted rearwardly to allow the cart to be run under it from in front, after which it is tilted forwardly and maintains its position upon the cart, whereby it may be drawn to the desired location. It is so balanced that when tilted rearwardly it will automatically maintain the tilted position, and when tilted forwardly or loaded upon the cart it will also automatically maintain its position thereon.

Having briefly outlined our improved construction, as well as the function it is intended to perform, we will proceed to describe the same in detail, reference being made to the accompanying drawings, in which—

Figure 1:
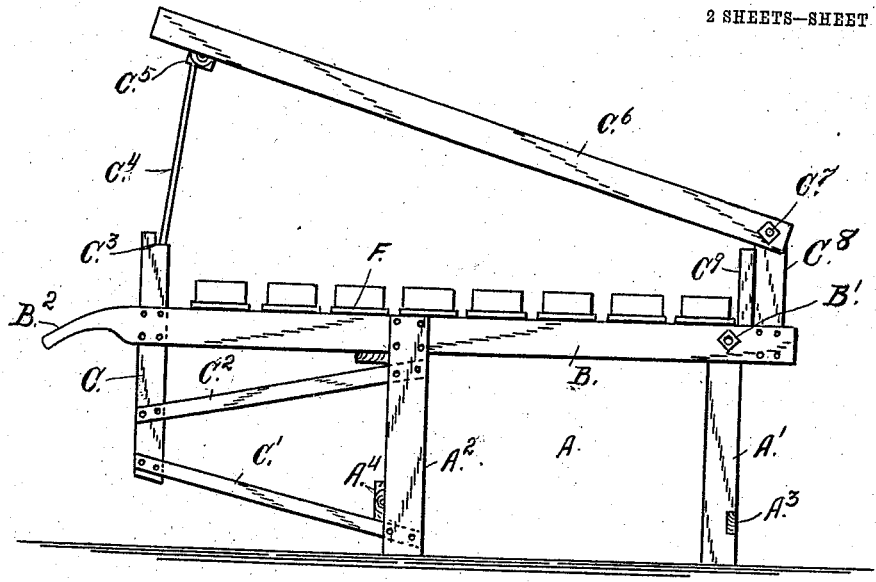
Figure 2:
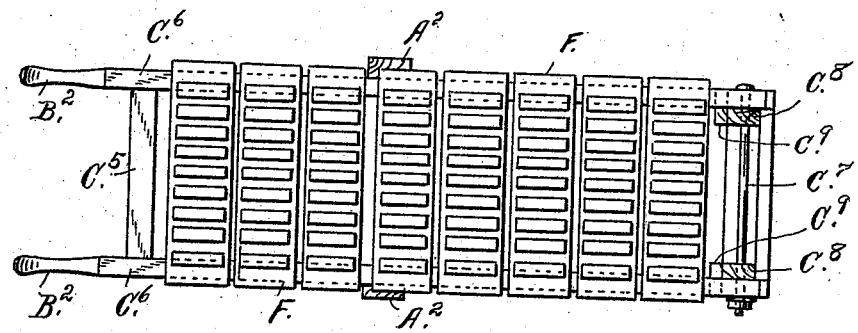

Figure 1 is a side elevation of our improved drying-rack, showing the upper deck raised. Fig. 2 is a top view showing the upper deck lowered and filled with brick. Fig. 3 illustrates the rack and cart, the rack being tilted rearwardly and the cart in the act of entering from the front. Fig. 4 shows the rack loaded upon the cart.

The same reference characters indicate the same parts in all the views.

Let A designate our improved drying-rack considered in its entirety. This rack is provided with supporting-legs $A'$ and $A^2$, there being two of these legs on each side. The forward legs $A'$ are connected by a piece $A^3$, while the rear legs $A^2$ are connected by a piece $A^4$. The forward legs are hinged to the brick-supporting bars B, as shown at $B'$, whereby the legs $A'$ are adapted to swing inwardly to the position shown in Fig. 4, to allow the cart to pass beneath the rack from in front. The legs $A^2$ are rigidly secured to the bars B. A part C is connected with the legs $A^2$ by strips $C'$ and $C^2$. This part C passes upwardly between the rear ends of the bars B and is secured thereto by suitable fastening devices, as nails or screws. This part C also projects above the bars B and is provided with an offset $C^3$ to receive the lower end of a prop $C^4$, whose upper end engages a cross-piece $C^5$, connecting the two bars $C^6$, which are hinged at $C^7$ to an upwardly-projecting part $C^8$, connected with the forward extremities of the bars B. The bars B may be said to form the lower deck of our improved rack and the bars $C^6$ the upper deck of the rack. While the lower deck is being loaded, the upper deck is supported in the position shown in Fig. 1 by the prop $C^4$, which may consist of any suitable device. Adjacent the upwardly-projecting part $C^8$ and located immediately in the rear of the same is a part $C^9$, which serves as an additional support for the bars $C^6$ when they are in the lower position, or that shown in Figs. 3 and 4.

Attention is called to the fact that when the rack is in the position shown in Fig. 1 the lower extremity of the part C occupies a position above the ground or other surface upon which the rack rests. It must also be noted that the legs A² are located somewhat rearwardly of the center of the rack and also in such a position that when the rack is tilted, as shown in Fig. 3, the center of gravity will be in the rear of a vertical line D, passed through the point where the legs A² engage the ground or other surface upon which the rack rests. When in this position, the lower extremity of the part C is made to rest upon the ground. This raises the forward part of the rack sufficiently to allow the cart E to pass under the lower deck. As the cart is inserted the legs A' swing rearwardly and finally occupy the position shown in Fig. 4. As soon as the cart has been moved rearwardly as far as it will go the user takes hold of the handles B² of the bars B and tilts the rack forwardly, whereby it is loaded upon the cart, as shown in Fig. 4, the cart occupying such a position that the rack will automatically maintain its position thereon, since the platform E' of the cart extends rearwardly of the center of gravity and is also so arranged that when the rack is in position thereon the platform is tilted slightly downwardly from its rear extremity. The rack may then be drawn to the drying location and left until the bricks are ready to be carried to the kiln.

From the foregoing description the use and operation of our improved device will be readily understood. When the bricks are first formed or molded, they are placed upon pallets F or strips of sufficient width to support the bricks. When one of these pallets is full, it is placed upon the bars B, occupying a transverse position, the bars C⁶ having been raised to the position shown in Fig. 1, and the prop C⁴ inserted to hold them in that position until the bars B, forming the lower deck, are filled with pallets. As soon as this is done the prop C⁴ is removed and the upper deck lowered to occupy a position parallel with the lower deck. In this event the rear extremities of the bars C⁶ rest upon the part C of the structure. The upper deck of the rack is then filled with the brick-holding pallets. The rack is then tilted to the position shown in Fig. 3 and the cart placed thereunder, as shown in Fig. 4. The rack is then hauled by the user to the drying location, after which the cart is removed. When it is desired to place the bricks in the kiln—that is to say, after they have been suitably dried—the rack is again loaded upon the cart in a manner heretofore described and then taken to the kiln, where the bricks are removed for the first time after placing them upon the rack.

Having thus described our invention, what we claim is—

1. A brick-drying rack composed of a pallet-supporting deck, forwardly-located hinged legs, and a pair of rearwardly-located legs, located rearwardly of the center of the rack when the deck is in a horizontal position, the rack being also provided with a rearwardly-located part whose lower extremity is above the ground or other supporting-surface when the deck is in a horizontal position, the arrangement of the said parts being such that when the rack is tilted rearwardly to cause the said rearwardly-located part to engage the ground or other surface, the center of gravity of the rack or the rack and its load is thrown to the rear of a line passed through the point where the rear legs of the rack engage the supporting-surface.

2. The combination of a brick-drying rack composed of a pallet-supporting deck, a central support located in the rear of the center of the deck when the latter is in a horizontal position, a hinged forward support engaging the supporting-surface when the deck is in a horizontal position, and a rearwardly-located support which is above the surface when the forward support engages the latter, the arrangement of the parts being such that when the rack is tilted on the central support sufficiently to throw the rearward support to engagement with the supporting-surface, the center of gravity of the rack is thrown to the rear of a line passed through the point where the central support engages the supporting-surface, and a truck removably connected with the rack, the hinged forward support being in the path of the truck when placed in position whereby the hinged support is raised, the said support being allowed to drop when the truck is removed.

3. The combination of a brick-drying rack consisting of a central support and forward and rearward supports, the forward support being hinged or pivoted the rearward support being normally above the supporting-surface and the rack being tiltable on the central support to cause the rearward support to engage the supporting-surface and lift the forward support above the supporting-surface, the central support being located to bring the center of gravity forward of it when the rack is in the horizontal position and rearward of the point where the central support engages the supporting-surface when the rack is tilted rearwardly; and a truck removably connected with the rack, the hinged forward support being in the path of the truck when placed in position, whereby the said support is raised and allowed to drop when the truck is removed.

4. A brick-drying rack composed of a pallet-supporting deck, forward and rearwardly located legs supporting said deck, the forward legs being pivoted to fold as described, an upwardly-projecting forwardly-located part connected with the lower deck, and an upper deck pivotally connected with said upwardly-projecting part, the rack being provided with a rearwardly-located part engaging the rear extremity of the upper deck when the latter is in the lower position.

In testimony whereof we affix our signatures in presence of two witnesses.

CHARLES R. KNIGHT.
JACOB TENNESEN.

Witnesses:
DENA NELSON,
LEONORE O'BRIEN.